(12) United States Patent
Hunter et al.

(10) Patent No.: US 6,479,102 B1
(45) Date of Patent: Nov. 12, 2002

(54) METHOD OF USING A PENETRATING SEALER

(76) Inventors: Allen Hunter, 6130 Lockton La., Fairway, KS (US) 66205; Valery Tokar, 12608 Flint, Overland Park, KS (US) 66213

( * ) Notice: Subject to any disclaimer, the term of this patent is extended or adjusted under 35 U.S.C. 154(b) by 0 days.

(21) Appl. No.: 09/911,992

(22) Filed: Jul. 24, 2001

(51) Int. Cl.[7] .......................... B05D 5/00; C04B 41/45; C04B 41/46; C04B 41/48; C04B 41/49
(52) U.S. Cl. ...................................... 427/256
(58) Field of Search .................. 427/256, 136, 427/137

(56) References Cited

PUBLICATIONS

Chroman, Elanor, The Potter's Primer, © 1974, Hawthorn Books, Inc., pp.186–187, 195–197, 231.
Beard, Peter, Resist and Masking Techniques, ® 1996, University of Pennsylvaina Press, pp. 16, 17, 28, and 33.

Primary Examiner—Fred J. Parker
Assistant Examiner—William Phillip Fletcher, III
(74) Attorney, Agent, or Firm—Spencer Fane Britt & Browne LLP

(57) ABSTRACT

A method of using a penetrating protective sealer to mark a message onto a porous surface is provided. Once the sealer has been applied to the surface and is allowed to dry, the message will not be visible. An indicator dye can be used to aid in application of the sealer; once the sealer has fully cured, the indicator dye is no longer visible. When the marked surface becomes wet, the portion of the surface that has been treated by the sealer will repel water; the remainder of the surface will absorb water and turn dark. The contrast in color created between the darker, untreated/wet, surface and the lighter, treated/dry, surface will result in a visible message to an observer. The message can be a warning or an advertisement. A thickened penetrating sealer composition and a method of using the same is provided. The thickened sealer results in neat, clean, crisp edges for the message.

5 Claims, 1 Drawing Sheet

METHOD OF USING A PENETRATING SEALER

FIELD OF THE INVENTION

The present invention relates to a composition for marking a message on a the surface of a porous substrate, such as concrete, and a method of using a penetrating protective sealer for marking a message onto the surface of a porous substrate. The message of the instant invention is only visible while the surface is wet.

BACKGROUND OF THE INVENTION

Various protective sealers have been developed to protect concrete, masonry, stone and other porous substrates from the deleterious effects of the environment such as water, chlorides and airborne pollutants. These protective sealers can be categorized into two types: (1) surface-coating sealers; and (2) penetrating sealers. Both types of protective sealers originate as liquids that can be applied using either rollers, brushes, low pressure sprayers, or cartridge-type applicators.

Surface-coating sealers, such as paints, varnishes, and most stains, generally remain on the surface of the treated substrate to act as a shield to protect the substrate from the deleterious substances. These surface coatings form a continuous film on the surface of the substrate that remains visible under both wet and dry conditions. For example, a non-pigmented surface-coating sealer will often shine when applied to a concrete surface. If only a portion of the concrete surface is treated with the surface-coating sealer, only the treated portion will shine. Additionally, the treated portion of the surface will have a slightly different texture and contour than the untreated portion of the surface due to the continuous film.

As an alternative to surface coatings, penetrating sealers are specifically designed to form discontinuous films and effectively penetrate the treated substrate. Because penetrating sealers form discontinuous films on a surface, both treated and untreated portions of the surface will have virtually identical textures and contours. As a result, a non-pigmented penetrating sealer will not be visible under dry surface conditions.

SUMMARY OF THE INVENTION

A principle object of the present invention is to provide a method for forming a message on a porous surface, such as concrete, that is only visible under wet conditions. This object is accomplished by forming a desired message onto the surface with a non-pigmented penetrating sealer. An indicator dye (also called a fugitive dye) may be added to the sealer to aid application. Upon complete curing of the sealer, the indicator dye will no longer be visible on the surface. The penetrating sealer originates in a liquid form that can be applied to the surface using standard painting equipment such as rollers, brushes, low pressure sprayers, and cartridge-type applicators, or any other suitable application tool. The desired message is painted onto the surface with the liquid penetrating sealer; the remainder of the given surface is left untreated. Once the penetrating sealer has fully reacted with the treated substrate, the sealer will form a discontinuous film over the treated portion of the surface that is virtually invisible under dry conditions. Under wet conditions, the treated portion of the surface will repel water while the untreated portion will absorb water. This will result in a variance in color between the treated and untreated portions of the surface. For example, where the surface is concrete, the untreated portion will be darker in color because it absorbs water, while the treated portion will be lighter in color because it remains dry. Thus, when a message has been painted onto the surface with the sealer, it will become visible under wet conditions.

In general, penetrating sealers are designed as protective sealers, which are to be applied to the entire exposed surface of a treated substrate. For example, water base siloxane penetrating sealers have a rather low viscosity to allow for easy spreading over the entire surface of a concrete sidewalk or driveway, and to allow deep penetration into the pores of the concrete. Because the object of the instant invention is to provide a message, the inventive method, which treats only a portion of the surface, contradicts the intended protective use of penetrating sealers. Thus, the low viscosity of current protective penetrating sealers results in bleeding around the outer edges of the treated portion of the surface, which in turn results in jagged edges for the message. It is desirable to have crisp, clean, neat edges in a message to increase legibility of the message. Therefore, it is an object of the instant invention to provide a composition that does not result in a bleeding effect around the edges of a desired message. This object is achieved through the addition of a thickening agent (also referred to as gums) to the sealer to add viscosity and prevent bleeding. In the example of a siloxane sealer, hydroxy ethyl celluose can be used as a thickening agent.

When a determined message is intended to cover a rather large area, the use of the thickened composition may be less desirable. In such a situation, the thickened composition can be used to outline the message, and the standard, non-thickened, penetrating sealer can be used to fill in the outlined message. This method will allow increased application efficiency, while at the same time maintain a neat edge for the message.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DESCRIPTION OF THE PREFERRED EMBODIMENT

A preferred embodiment of the present invention is hereinafter described with reference to the accompanying drawings.

Figure 3:
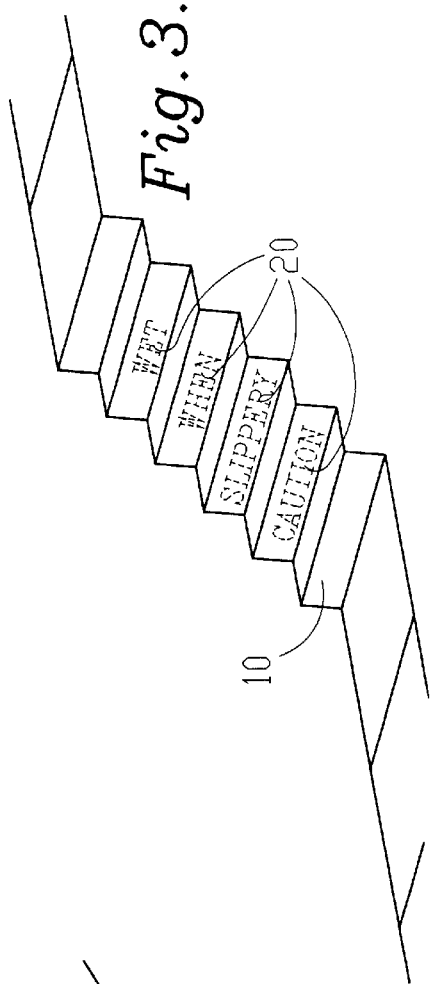
FIG. 3 is a perspective view of a dry concrete staircase that has been marked using the method of the instant invention.
Figure 4:
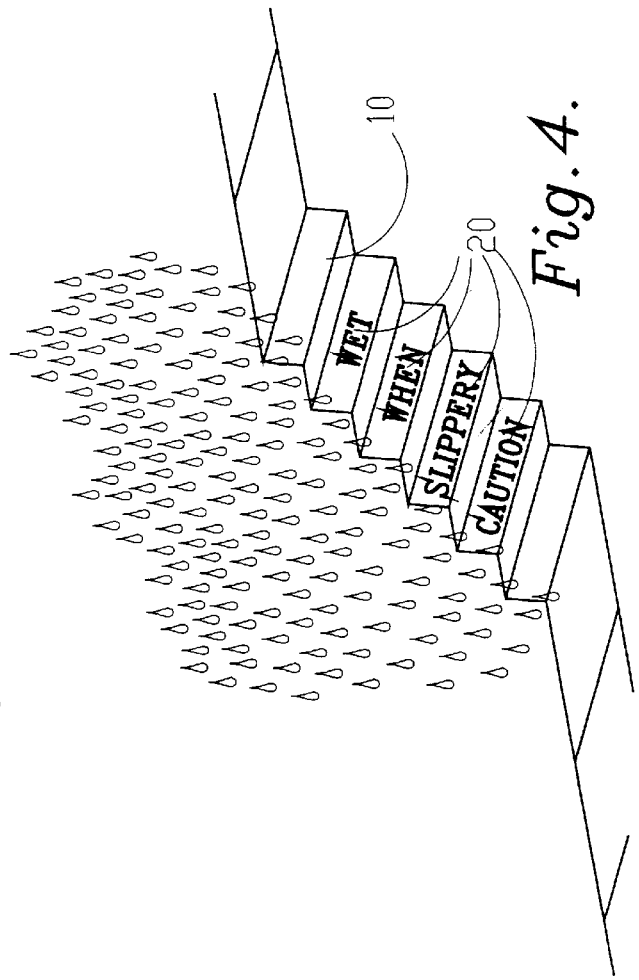
FIG. 4 is a perspective view of the marked concrete staircase of FIG. 3 in a wet state.
Figure 1:
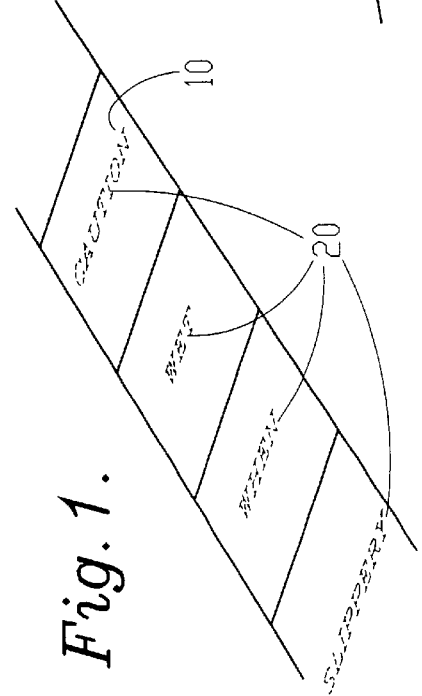
FIG. 1 is a perspective view of a dry concrete surface that has been marked using the method of the instant invention.
Figure 2:
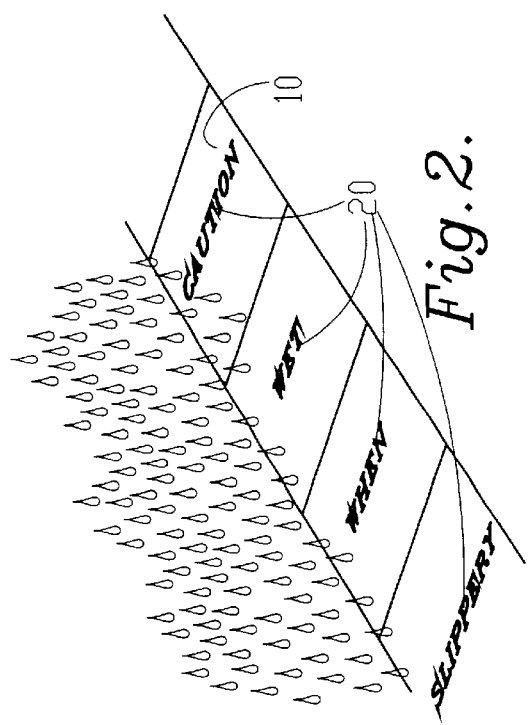
FIG. 2 is a perspective view of the marked concrete surface of FIG. 1 in a wet state.

FIGS. 1 and 2 both show a perspective view of a concrete surface that has been marked using the method of the instant invention. FIG. 1 shows the surface under dry conditions, and FIG. 2 shows the surface under wet conditions. FIGS. 3 and 4 both show a perspective view of a concrete staircase that has been marked using the same method as the surface of FIGS. 1 and 2. FIG. 3 shows the staircase under dry conditions, and FIG. 4 shows the staircase under wet conditions.

The object of the inventive method is to provide a message that is visible to observers under wet surface conditions, but not visible under dry surface conditions. This object is accomplished through the use of a penetrating protective sealer. The sealer of the preferred embodiment is a water base, non-pigmented (may include fugitive dye), siloxane sealer. Siloxane is one of several silicone water repellants. Other silicone water repellants include siliconates, silicone resins, silanes and polymeric siloxane. The method of the instant invention can utilize virtually any penetrating sealer or wax, including both microemulsions and macroemulsions. Additionally, the penetrating sealer can be either water base or solvent-borne materials.

The inventive method can be used to apply a message to any porous substrate having an exposed surface, such as concrete sidewalks, driveways, parking decks, lane barriers, bridges, ramps, marine platforms, masonry structures, brick, stucco and stone. The message conveyed by the inventive method can be any type of message, such as a warning-message or an advertisement. The message can include letters, words, logo's, designs, subjects of art, or any combination of the same.

The first step of the inventive method is to determine a message to be applied to a surface. In the preferred embodiment shown in FIGS. 1 and 2, a warning-message is applied to a concrete surface of an outdoor sidewalk. In the preferred embodiment shown in FIGS. 3 and 4, the warning message is applied to a concrete staircase.

The next step is to mark the surface using the sealer. The sealer can be applied using conventional painting instruments, such as rollers, brushes, sprayers, cartridge-type applicators, and any other application tool found suitable. In one embodiment of the invention a thickened sealer is used to mark the message. In the preferred embodiment, using a siloxane sealer, hydroxy ethyl celluose is added as a thickening agents. The use of a thickening agent prevents bleeding around the edges of the message, resulting in a crisp, clean, neat message.

When a message is intended to cover a large area, it may be desirable to use a combination both a thickened and non-thickened sealer. In such a situation, the thickened sealer can be used to outline the message, providing crisp, clean edges for the message. Then the non-thickened, or standard (having a normal viscosity), sealer can be used to fill in the outlined message. This can result in substantial time savings in applying the sealer to mark the message.

Because the sealer is generally non-pigmented, the message will be virtually invisible once the sealer has been applied to a surface and allowed to dry. In the preferred embodiment, surface 10 is not hazardous when dry, making a warning-message unnecessary. Thus, message 20, shown in phantom in FIGS. 1 and 3, is not visible to observers while surface 10 remains dry. Alternatively, when surface 10 is wet, message 20, shown in FIGS. 2 and 4, is displayed on surface 10 to caution observers of hazardous conditions. When the surface is wet, the portion of surface 10 covered by the sealer will repel water. The remainder of surface 10 will absorb water and turn a darker color than the dry portion of surface 10. The contrast between the dark and light portions of surface 10 will result in message 20 being visible to observers.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above inventions, and in the construction thereof, without departing from the spirit and scope of the inventions. It is intended that all matter contained in the above description and shown in the accompanying drawings shall be interpreted as illustrative and not meant in a limiting sense.

Having now described the features, discoveries and principles of the invention, the manner in which the inventive porous surface marking composition is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention what is claimed as new and desired to be secured by Letters Patent is as follows:

1. A method of using a protective sealer comprising the steps of:
   determining a message to be placed on a porous surface;
   applying a protective sealer to a portion of said porous surface in the form of said message, wherein said protective sealer penetrates the pores of said porous surface;
   allowing moisture to contact said surface to reveal said message; and
   permitting said moisture to evaporate to conceal said message.

2. The method as claimed in claim 1 further including the step of adding a thickening agent to said protective sealer.

3. The method as claimed in claim 1 wherein said message is a warning-message.

4. The method as claimed in claim 1 wherein said message is an advertisement.

5. A method of forming a message on a surface comprising the steps of:
   determining a message to be placed on a porous surface;
   outlining said message with a thickened protective sealer, wherein said thickened protective sealer penetrates the pores of said porous surface;
   filling said outlined message with a protective sealer, wherein said protective sealer penetrates the pores of said porous surface;
   allowing moisture to contact said surface to reveal said message; and
   permitting said moisture to evaporate to conceal said message.

* * * * *